Feb. 26, 1952

J. A. YERKES 2,587,269

CABINET RECORD HOLDER

Filed Aug. 2, 1947

3 Sheets-Sheet 1

INVENTOR.
JOHN A. YERKES

BY

Hammond & Littell
ATTORNEYS

Feb. 26, 1952 J. A. YERKES 2,587,269

CABINET RECORD HOLDER

Filed Aug. 2, 1947 3 Sheets-Sheet 2

INVENTOR.
JOHN A. YERKES
BY
Hammond & Littell
ATTORNEYS

Feb. 26, 1952 J. A. YERKES 2,587,269

CABINET RECORD HOLDER

Filed Aug. 2, 1947 3 Sheets-Sheet 3

INVENTOR
JOHN A. YERKES
BY
Hammond & Littell
ATTORNEYS

Patented Feb. 26, 1952

2,587,269

UNITED STATES PATENT OFFICE 2,587,269

CABINET RECORD HOLDER

John A. Yerkes, New York, N. Y.

Application August 2, 1947, Serial No. 765,689

6 Claims. (Cl. 312—10)

This invention relates to a cabinet type holder for flat disks and especially to a holder for supporting large, thin disks, such as phonograph records.

One of the objects of the invention is to provide a cabinet having a record holding rack, said cabinet and rack being easily and economically constructed.

Another of the objects of the invention is to provide a cabinet type record rack wherein the records can be easily selected and removed therefrom.

Still another object of the invention is to provide an improved means for arranging the records in a cabinet in relation to record selecting indices.

One of the features of the invention is the use of an integral or unitary assembly of a plurality of integrally joined bent wires for separating the records. The assembly of separated wires can be arranged in parallel relationship and joined to longitudinally extending wire members by welding, brazing, soldering, or in any suitable manner. The wire assembly can be mounted as a unit in a suitable cabinet.

In one aspect of the invention, straight record separating wires of the correct size and length are first arranged parallel to each other, then integrally joined to the longitudinally extending means, and then the assembly bent to the desired shape. It, of course, is possible to bend the wires first before integrally joining thereto the longitudinal extending members.

Another feature of the invention is to provide the supporting points for the records such that the edge of one portion of a record is close to an index mark therefor so that the desired record can be selected with ease.

It is important that the record index marks be arranged so as to accurately indicate the records and so that the selection of a record can be made easily and without hesitation. One manner of accomplishing this is to place the front support for the records adjacent the front horizontal diameter of a record and to place the index numbers on said front support near said record edges.

In a preferred form, the record separating wire elements are bent in the form of a "C" with the top and bottom legs substantially parallel and longer than the radius of the records. When the wires are bent or shaped in this manner, they will be especially adapted to correctly keep the records separated during insertion and removal from the cabinet. Other arrangements and forms of record separating wires can be used.

In one form of the invention, the records can be supported by a straight frame member adjacent the front edge of the record and by an inclined frame member at the lower rear edge. Then, when it is desired to remove a record, the selected record can be pushed toward the rear of the cabinet, such movement causing the record to roll up the inclined face of the rear support and thus raising the upper edge of the record above the other records so that it can be grasped and lifted out of the cabinet.

Still another feature of the invention is the provision of a staggered record arrangement by the use of a record support frame having notches therein. The front support of the cabinet can have notches formed therein so as to stagger alternate records and thus facilitate their removal from the cabinet. Various types of rear supports can be used at the bottom of the cabinet for supporting the rear edge of the record.

In another aspect of the invention, the record holder can be combined advantageously with an article of furniture such as a hassock, for example.

These and other objects, advantages and features of the invention will become apparent from the following description and drawings which are merely exemplary.

In a preferred arrangement of the invention, the record separating wire assembly 19 first will be described. Wires 20 (Figs. 1, 11) are spaced the desired distance apart to separate the records, and then the longitudinal joining wires 21 and 22 can be welded, brazed, soldered, or otherwise suitably fastened thereto so as to form a unitary assembly. The record separating wires can be "flocked" as is well known in the art. One manner in which the assembly can be constructed is to space straight record separating wires parallel to each other is desired and then join the longitudinal wires 21 and 22 thereto. Following this, the separating wires can be bent over a suitable form to the C-shaped arrangement of Figs. 1 and 11, the wires having two horizontal legs 20*a*, 20*b* and a vertical intermediate leg 20*c*. For the purpose of convenience, the wires are given the same numbers throughout the description herein.

Figures 1, 2, 3, 4:
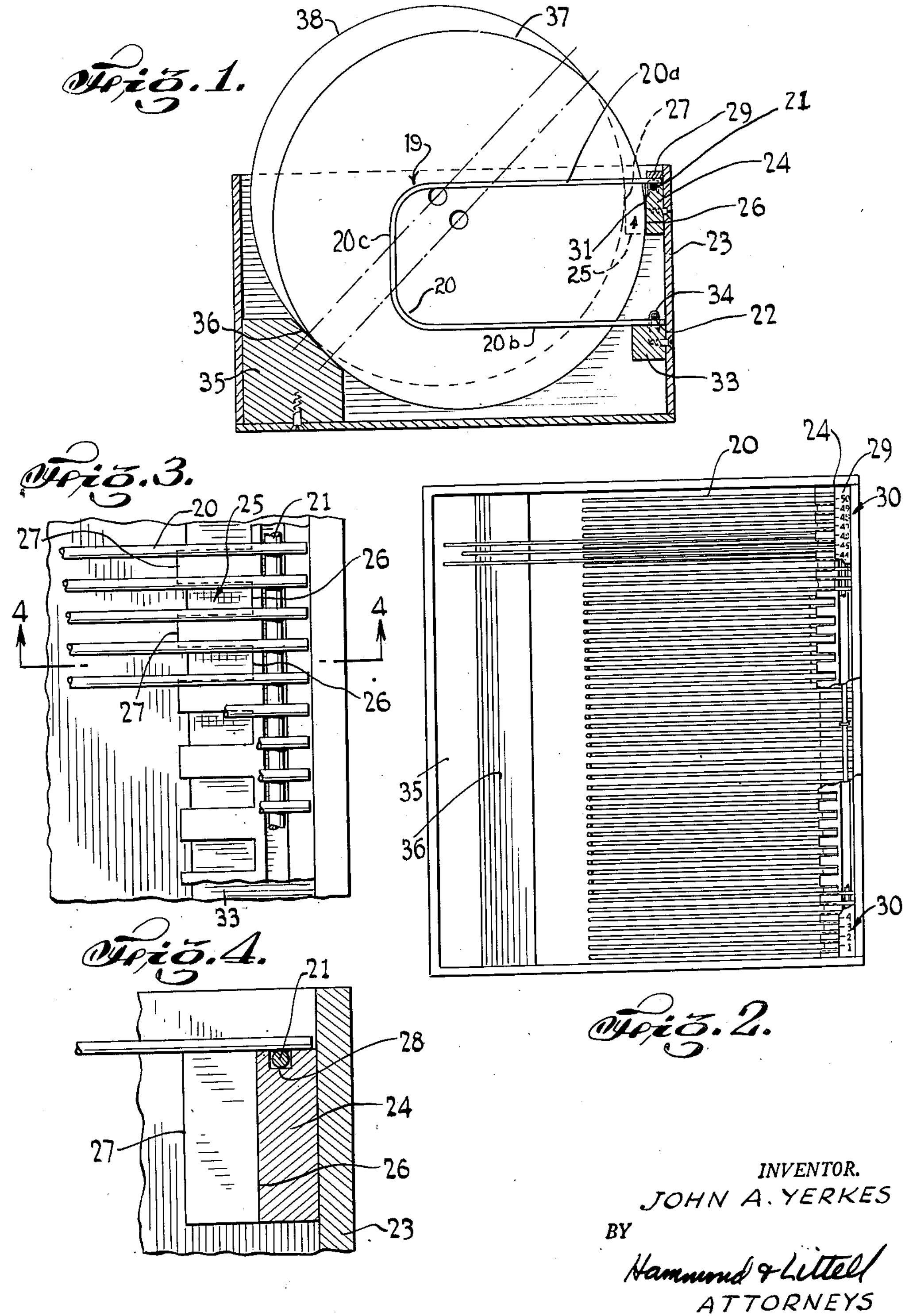
Fig. 1 shows an end sectional view of one form of the invention.
Fig. 2 shows a top view of the arrangement of Fig. 1 with parts thereof broken away.
Fig. 3 is an enlarged fragmentary plan view showing details of the staggered frame member of Figs. 1 and 2 with the cap or index carrying member removed.
Fig. 4 is a fragmentary sectional view taken along the line 4—4 of Fig. 3.

Cabinet 23 may have front record support 24 suitably fastened thereto. In the form shown in Fig. 1, and preferably, front support 24 has notches 25 cut therein, said notches having a width approximately coextensive with that between the center of two adjacent wires, such as can be seen in Fig. 3. In this manner, the maximum width of the notch between the side walls defining the notch is obtained so that the records can be placed between the separating wires with little or no interference with the side walls of the notches or danger of damaging the records. In addition, slight inaccuracies in the arrangement of the parts will not be too serious. Alternate records will rest against the bottoms 26 of every other notch, and records between the notches will have their edges resting upon the surfaces 27 of the front support. A longitudinal joining wire 21 (Fig. 4) may be fitted into a suitable groove 28 and a strip 29 (Fig. 1) placed thereover upon which index numbers 30 (Fig. 2) are imprinted. Suitable staples 31 or other fastening means may be employed to hold the unitary wire assembly in place on the front record support 24.

The bottom leg 20*b* (Fig. 1) of the wire assembly can be carried by the lower front support 33, staple 34 or other fastening means engaging the longitudinally extending wire 22 to hold the wire assembly in place.

At the rear of the cabinet a longitudinally extending block 35 having a relatively wide sloping surface 36 is fastened to the lower rear corner of the cabinet, it being evident that this block can be located as desired. The upper longitudinal legs 20*a* of the record separating wires can be arranged to be located approximately near the centers of records 37 and 38 to be placed in the cabinet. By locating the upper front support 24 near the horizontal diameters of the records to be carried, it is evident that the front edges of the records will be closely adjacent to indices placed on the front support. In this manner, the front edges of the records contacting surfaces 26 and 27 of the front support 24 are arranged close to the index strip 29, thus facilitating selection of the desired record. When a record is to be removed from the cabinet of Fig. 1, the front edge thereof, or suitable edge, can be grasped, and the record lifted from the cabinet.

Figures 5, 6, 7:
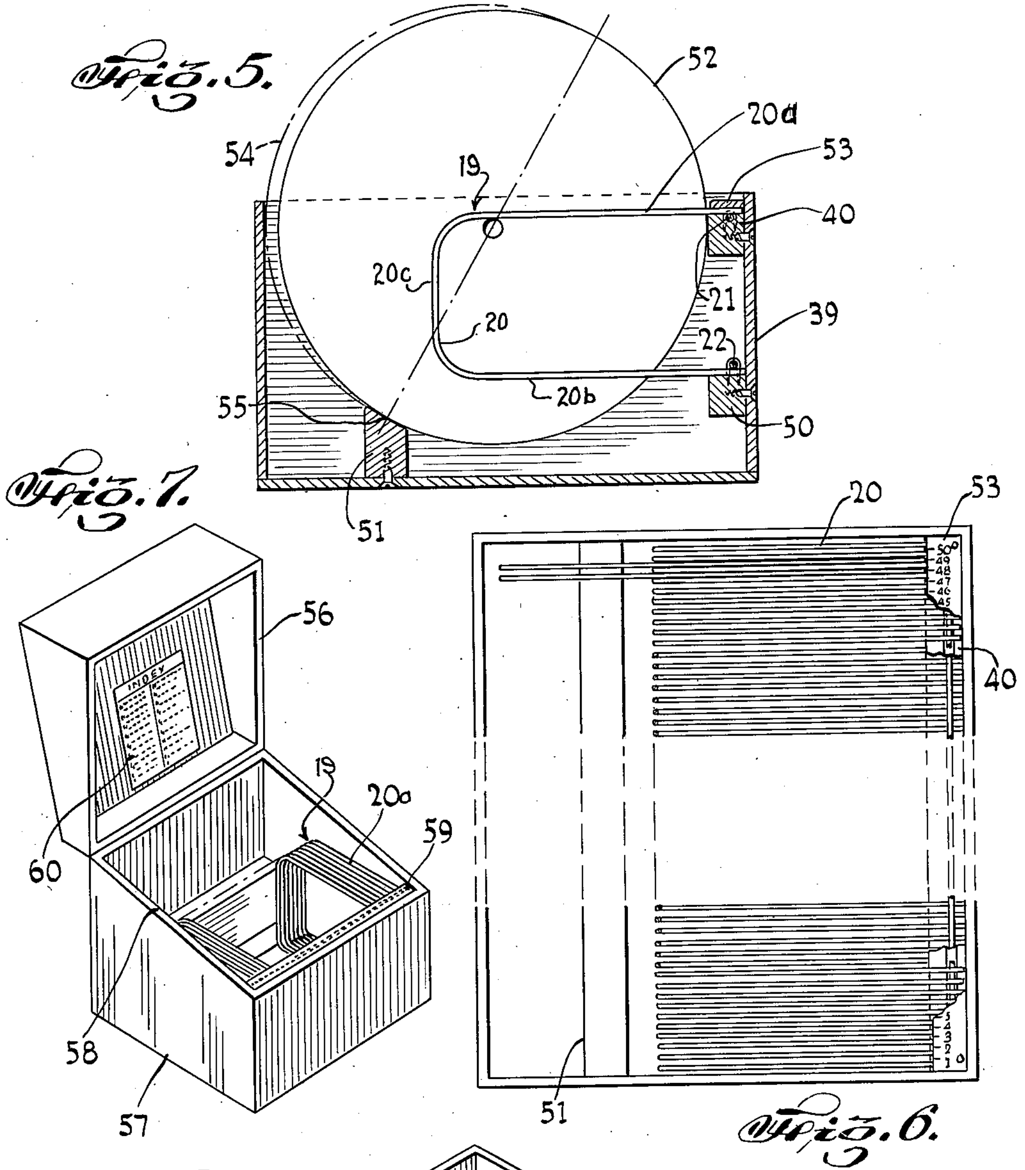
Fig. 5 is a sectional view of another form of the invention.
Fig. 6 is a plan view of the form shown in Fig. 5.
Fig. 7 is a perspective view of a cabinet with a top therefor.

A modified form of the invention is shown in Fig. 5 wherein cabinet 39 can have an upper front support 40 and lower front support 50 carrying the ends of the record separating wires 20 of the wire assembly 19. The longitudinally extending joining wires 21 and 22 are held in a manner similar to that described for Fig. 1. Toward the rear and bottom of the cabinet, a longitudinally extending strip 51 is provided having a sloping or inclined upper face 55. It is to be noted that the upper longitudinal legs 20*a* of wires 20 are approximately along the centers of records 52. Strip 53 may carry the index numbers for the records in the cabinet.

When it is desired to remove a record, it can be grasped or the finger placed thereagainst and the record rolled toward the rear of the cabinet to the position shown by the dotted lines 54. In the rolling process up the inclined face of support 51, the record will roll up the incline 55 of strip 51 and thus be in a position to be grasped for removal from the cabinet.

Figure 8:
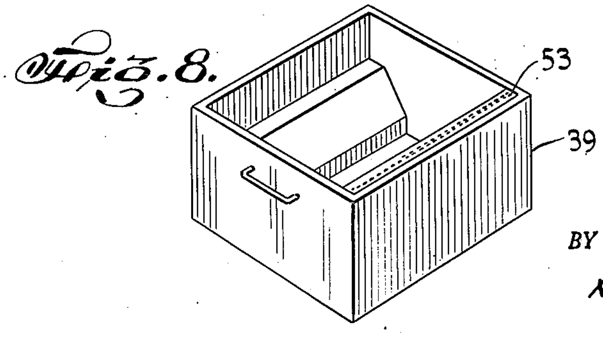
Fig. 8 is a perspective view of an open type of rack similar to that seen in Fig. 1.

Fig. 8 shows a perspective view of a cabinet similar to Fig. 1 with the index strip 53, the wire assembly being omitted for clarity.

The cabinet also may be constructed similar to that seen in Fig. 7 with a cover 56 and the sides 57 thereof having inclined surfaces or edges 58. An index strip 59 with numerals thereon is provided as in the other forms, and, if desired, an index card with the names of the records and corresponding numerals may be placed on the inside of the cover at 60. The record holder arrangement of either Fig. 1 or 5 can be employed.

If desired, a pair of longitudinally extending strips 61 and 62 (Fig. 9) having inset strips 63 and 64 may be used with the form shown in Fig. 1 and can be mounted on the bottom of the cabinet 65, spaced as indicated. The strips 63 and 64 may be of a plastic or of any suitable soft or resilient material, whereas strips 61 and 62 can be of wood or similar material. Record 66 will rest upon the lower longitudinally extending strip 63, the front edge of the record being supported by the bottom of one of the notches of the upper front support on the cabinet (Fig. 1). The other record 67 will have its lower rear edge supported on strip 64 and its front upper edge supported on one of the projections on the notched strip. In this manner, the centers of the records are spaced vertically from each other to facilitate grasping of the same to remove them from the cabinet. At the same time, the front edge of the record is close to the index strip, as discussed for Figs. 1 and 5. In the form shown in Fig. 9 and the other figures of the drawing, it is apparent that the records normally do not touch the bottom of the cabinet.

Figures 9, 10, 11, 12, 13:
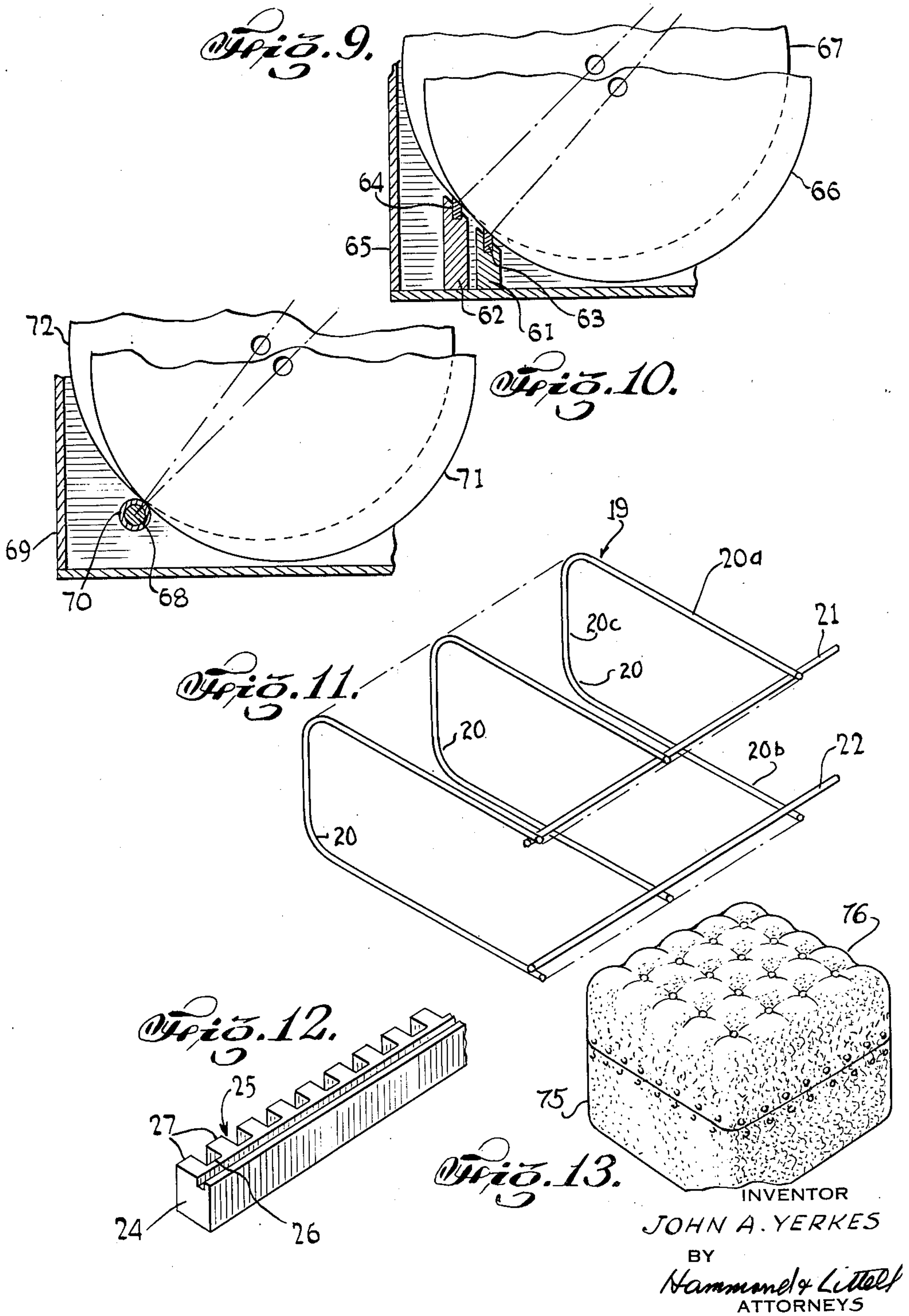
Fig. 9 shows a modified form of the bottom support for the records in the cabinet.
Fig. 10 shows still another form of the bottom support for the records.
Fig. 11 is a fragmentary view of the integrally joined record separating wire assembly, a number of the wires being omitted for clarity in the drawing.
Fig. 12 is a perspective view of the notched frame member, such as used in Figs. 1 to 4, inclusive.
Fig. 13 is a perspective view of a hassock which can house a record holder of the type shown in Fig. 7.

Still another form of rear support for the records is seen in Fig. 10 wherein a rod 68 may extend between the two end pieces of the cabinet 69, said rod preferably having a soft and resilient coating 70 thereon. The alternate records then will take the positions indicated by records 71 and 72 so that the centers thereof are separated along an inclined line. The front portions of the records in the modification shown in Fig. 10 may be supported in a manner similar to that shown in Fig. 1.

The invention also can be used in combination with a piece of furniture, such as a hassock as seen in Fig. 13. The hassock indicated can have a bottom portion 75 similar to bottom 57 of Fig. 7 with the exception that the top side edges are not inclined as are edges 58 in Fig. 7. Any of the various record holder arrangements using the unitary wire assembly shown can be placed in the bottom of the hassock. The top 76 can be hinged in any suitable manner on the bottom.

It is apparent that various arrangements can be made in the details of construction shown and various combinations employed without departing from the spirit of the invention except as set forth in the appended claims.

What is claimed:

1. In a disk type record holder cabinet, a receptacle, a unitary wire assembly having a plurality of record separating parallel bent wires joined integrally adjacent the ends by longitudinally extending wires welded thereto, a front support on said receptacle having record supporting surfaces adjacent thereto, means holding one end of said wires, and a second means on said receptacle holding the other ends of said wires.

2. In a disk type record holder cabinet, a receptacle, a unitary wire assembly having a plurality of record separating parallel bent wires joined integrally adjacent the ends by longitudinally extending wires to form a unitary structure, a front support on said receptacle having a record supporting surface adjacent thereto, said support having means holding one end of said wires, and a rear lower record support in said receptacle having an inclined face sloping away from said front support urging said records toward said front support record supporting surface.

3. In a disk type record holder cabinet, a receptacle, a unitary wire assembly having a plurality of record separating parallel bent wires joined integrally adjacent the ends by longitudinally extending wires forming a unitary structure, a front support on said receptacle having a record supporting surface adjacent thereto, said support having means holding one end of said wires of said unitary structure, said support having notches alternately arranged relative to records to be held between said wires to stagger alternate records relative to each other, and a rear lower record support in said receptacle having an inclined face sloping away from said front support.

4. In a disk type record holder cabinet, a receptacle, a plurality of parallel record separating wires mounted on said receptacle, a front support having record supporting surfaces adjacent thereto, said support having notches with side walls substantially in line with the centers of said individual wires whereby the width of said notches is greater than the width between said wires, and a rear support in said cabinet for supporting the lower rear edges of the records therein.

5. In a disc type record holder cabinet, a receptacle, a unitary wire assembly having a plurality of record separating parallel bent wires joined integrally adjacent the ends thereof by longitudinally extending wires to form a unitary assembly, means to hold said wire assembly in said receptacle, and record supporting surfaces holding records in said wire assembly in alternate staggered relationship.

6. In a hassock or the like, a lower casing, an upper casing hinged to said lower casing, a unitary wire assembly having a plurality of parallel record separating wires mounted in said lower casing, said wires being joined integrally by longitudinally extending wires welded or the like thereto, a front support mounted in said lower portion, said support having record supporting surfaces adjacent thereto, means to fasten said wires to said front support, and a lower rear support in said lower casing adapted to be contacted by the lower rear edges of records placed therein.

JOHN A. YERKES.

REFERENCES CITED

The following references are of record in the file of this patent:

UNITED STATES PATENTS

| Number | Name | Date |
|---|---|---|
| 1,030,534 | Pooler | June 25, 1912 |
| 1,366,203 | Meyer | Jan. 18, 1921 |
| 1,754,435 | Ray | Apr. 15, 1930 |
| 2,281,845 | Kaplan | May 5, 1942 |
| 2,313,821 | Handel | Mar. 16, 1943 |
| 2,363,574 | Cowan | Nov. 28, 1944 |

FOREIGN PATENTS

| Number | Country | Date |
|---|---|---|
| 170,236 | Great Britain | Oct. 20, 1921 |
| 454,889 | Great Britain | Oct. 9, 1936 |